United States Patent [19]
Benson et al.

[11] Patent Number: 5,381,888
[45] Date of Patent: Jan. 17, 1995

[54] RATCHET OPERATED CONTINUOUS CHAIN CONVEYOR STORAGE AND RETRIEVAL SYSTEM UTILIZING PLURALITY THEREOF

[75] Inventors: R. Brian Benson; David W. Kittel, both of Stillwater; Adrian A. Poynter, Forest Lake, all of Minn.

[73] Assignee: Cannon Equipment Company, Cannon Falls, Minn.

[21] Appl. No.: 210,657

[22] Filed: Mar. 18, 1994

Related U.S. Application Data

[63] Continuation of Ser. No. 867,727, Apr. 10, 1992, abandoned.

[51] Int. Cl.⁶ ............................................. B65G 23/00
[52] U.S. Cl. .................... 198/832.1; 198/460
[58] Field of Search ............ 198/347.4, 460, 832.1

[56] References Cited

U.S. PATENT DOCUMENTS

| | | | |
|---|---|---|---|
| 2,529,777 | 11/1950 | McInnis | 198/832.1 |
| 2,720,963 | 10/1955 | Stanley et al. | 198/832.1 X |
| 3,571,892 | 3/1971 | Levy | 198/832.1 X |
| 3,934,707 | 1/1976 | Bowman | 198/460 |
| 4,238,026 | 12/1980 | Mrugala et al. | 198/460 |
| 4,569,435 | 2/1986 | McGovney | 198/832.1 X |
| 4,872,548 | 10/1989 | Masuda et al. | 198/832.1 |

FOREIGN PATENT DOCUMENTS 0953596 12/1956 Germany ............................. 198/832.1

*Primary Examiner*—James R. Bidwell
*Attorney, Agent, or Firm*—Sten Erik Hakanson

[57] ABSTRACT

A ratchet driven continuous chain accumulator conveyor and an accuumulating and retrieval system includes a frame having a pair of continuous chains. The chains are mounted on sprockets on either end of the accumulating conveyors and run in upper and lower chain channels. A hydraulic drive cylinder is supported by the frame of each accumulating conveyor and includes gravity dogs on an operable piston end thereof. The gravity dogs provide for imparting a ratcheting motion to each pair of chains through extension and retraction of the drive cylinder. Each accumulating conveyor includes a plurality of lift means along the length thereof for lifting cases from contact with the driving chains for relieving weight pressure thereon. The accuumulating and retrieval includes a computer control and loading mechanisms for automatically loading the accumulator conveyors with product.

12 Claims, 11 Drawing Sheets

RATCHET OPERATED CONTINUOUS CHAIN CONVEYOR STORAGE AND RETRIEVAL SYSTEM UTILIZING PLURALITY THEREOF

This is a continuation of application Ser. No. 07/867,727, filed Apr. 10, 1992, now abandoned.

BACKGROUND

1. Field of the Invention

The present invention relates generally to conveyors and systems that provide for the automatic storage and retrieval of merchandise and, in particular, such conveyors as used in the storage and retrieval of refrigerated products.

2. Background of the Invention

Various systems are known in the art that provide for the storage and retrieval of products and, in particular, food goods. With food goods and, in particular, dairy products, after the product has been manufactured and packaged it is typically stored in a central refrigerated warehouse for ultimate selective shipment to retail establishments. In the case of milk, after it has been bottled the individual containers are packaged into cases and the cases are then stored in a refrigerated warehouse from which they are ultimately loaded onto trucks and delivered to grocery stores and the like. Typically, the storage facility will be on the same site at which the bottling occurs.

In current dairy operations, a standard case is used and the dairy bottles are also standardized in size so that, for example, four one-gallon bottles or six one-half gallon bottles fit within the confines of the case. Case loading equipment is well known in the art and is used to load the cases with the particular size bottle. Also, case stacking machines are well known in the art that provide for stacking of the cases, typically five or six levels high, wherein the cases are designed to nest within each other. Thus, after the loading and stacking procedures, the stack of cases are conveyed on a continuously driven conveyor to the storage area. In many such systems, the stacks of cases are delivered to the storage area on an in-feed conveyor that runs perpendicularly to a plurality of storage conveyors. Hydraulically operable gates or stop means are known to stop the progress of a stack of cases along the in-feed conveyor so that a loading means, also hydraulically operable, can be operated to push the case stack onto one of the plurality of accumulator or storage conveyors. Recognition means, such as paint coding, bar coding, or video visual recognition can be used to signal control means as to the contents of the case stack so that the stack can be loaded onto the desired accumulator conveyor.

The individual stacks are then moved along the accumulator conveyors to a discharge end thereof. An out-feed conveyor runs perpendicular to the discharge ends of the storage conveyors, onto which out-feed conveyor the stacks can be loaded for distribution thereof to a truck loading area for ultimate retail distribution. The discharging from the storage conveyors onto the out-feed conveyor can also be accomplished automatically through the use of the control means.

A problem with the prior art concerns the parallel storage conveyors. Continuously driven chain conveyors are known, however, such conveyors require the use of drive motors on the side thereof that prevent such conveyors from lying closely adjacent each other. In other words, space must be allowed between each of the storage conveyors which increases significantly the size of the storage room in which the conveyors are located. Storage room size is, however, desirably kept to a minimum where the storage area is a refrigerated space. Moreover, electric drive motors generate heat that further negatively impacts refrigeration costs. Ratchet type storage conveyors are known wherein each conveyor includes a plurality of hydraulic cylinders that operate gravity dogs. The gravity dogs directly contact the bottom of the case or object for moving it successively in a ratcheting motion from one end of the storage conveyor to the other. Such conveyors can lie directly next to each other as the drive means are contained centrally thereof and can minimize heat contribution as the compressor therefor can be located outside of the refrigerated space. However, the plurality of hydraulic cylinders that are needed for operation, can increase the cost of purchasing and maintaining such a storage conveyor system.

Accordingly, it would be desirable to have storage conveyor means that can lie directly next to each other and be driven in a manner that is inexpensive and reliable. Furthermore, in any such automated storage and retrieval system, it is always desirable to have further improvements in the efficiency and ease of control thereof. In particular, it is desirable to have a dairy storage system whereby lower volume products can be retrieved in an efficient manner.

SUMMARY OF THE INVENTION

The present invention concerns hydraulically driven ratchet continuous chain conveyors and a storage and retrieval system utilizing such conveyors. Each accumulator/storage conveyor includes a frame having a pair of continuous chains. The chains are mounted on sprockets rotating at either end of the storage conveyors, and run in upper and lower chain channels. A hydraulic drive cylinder is supported by the frame of each storage conveyor and includes gravity dogs on an operable piston end thereof. The gravity dogs provide for imparting a ratcheting motion to each pair of chains through extension and retraction of the drive cylinder. Each storage conveyor includes a plurality of lift means along the length thereof for lifting cases from contact with the driving chains for relieving weight pressure thereon. In the desired form of the system of the present invention, some of the storage conveyors include automatic discharge means at their discharge ends and the remainder of the storage conveyors do not have such automatic mechanisms and are unloaded manually. The conveyors having automatic discharge ends include a further cylinder for pushing individual stacks of product onto an out-feed conveyor running directly adjacent and perpendicular to the out-feed ends of the storage conveyors. A second out-feed conveyor is spaced from the first out-feed conveyor and runs parallel thereto. The second out-feed conveyor is used for conveying individual cases that have been manually transferred from the manual storage conveyors thereto. In this manner, speciality orders of lower volume product can be specifically selected and placed on the second out-feed conveyor. The first out-feed conveyor transports the stacks of cases to an appropriate loading dock area having means for assembling the stacks of cases onto a dolly for facilitating loading onto a truck. The second out-feed conveyor first passes through a stacking machine for stacking the individual cases to a desired height. From the stacking machine, the stacked cases then are directed by conveyor means to a loading dock area for assembly onto a dolly.

It will be appreciated by those of skill that the ratchet operated chain conveyors can lie directly adjacent each other, thereby providing for a storage area that is more compact in size. Moreover, a single drive cylinder per chain ratchet conveyor reduces the cost of such a system, as multiple drive pistons per storage conveyor are not required.

The present invention also provides for a combined automatic and manual order retrieval system. Thus, in a given product order, the portion thereof that represents high volume product can be handled fully automatically, while at the same time any portion thereof that consists of low volume product can also be handled efficiently from the same storage facility and at substantially the same time.

DESCRIPTION OF THE DRAWINGS

A further understanding of the structure, function and advantages of the present invention can be had by referring to the following detailed description which refers to the following figures, wherein.

DETAILED DESCRIPTION

Figure 1:
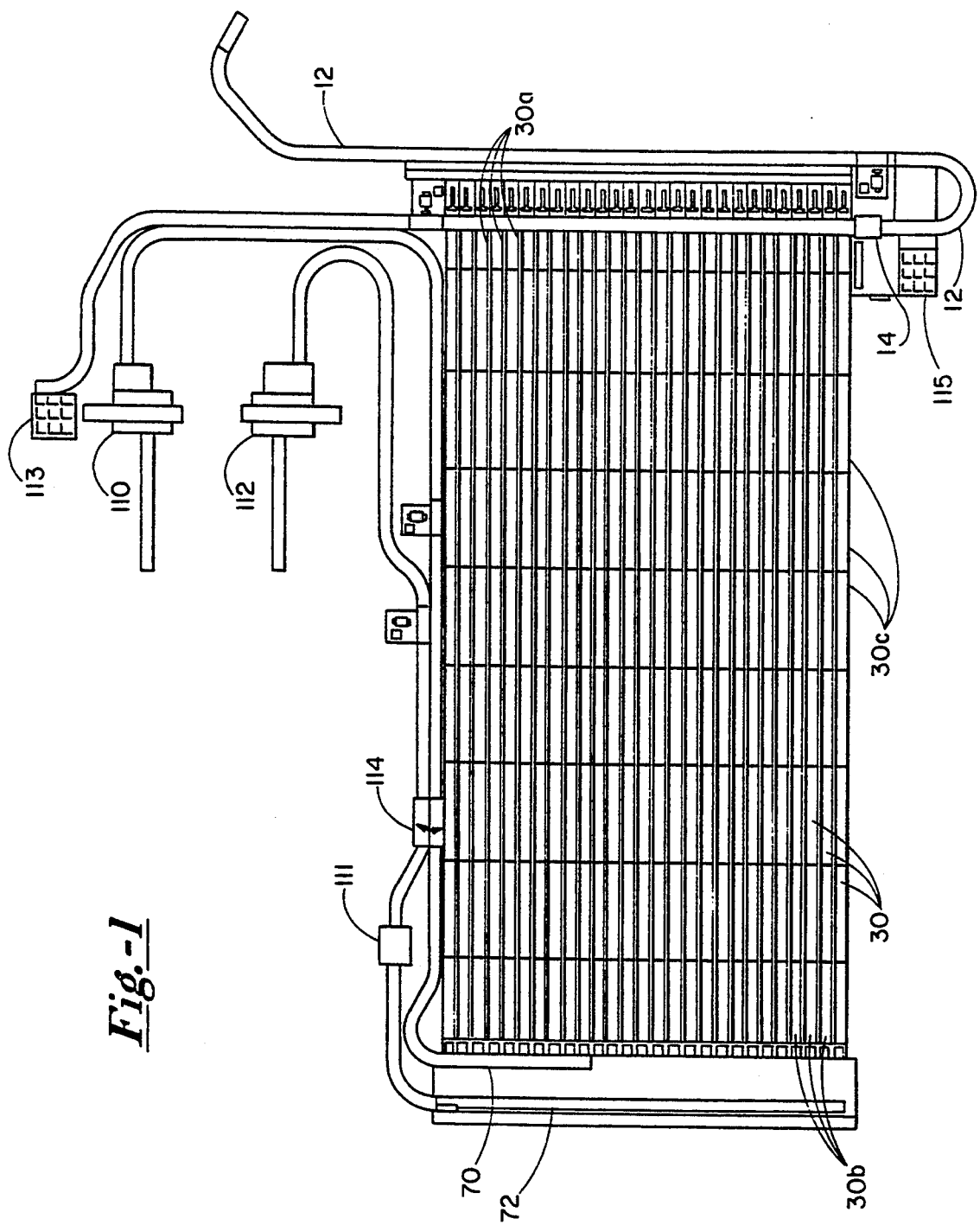
FIG. 1 shows a top plan view of the present invention.

The storage and retrieval system of the present invention is seen in FIG. 1, and generally designated by the numeral 10. For purposes of illustrating the preferred form of the present invention, it will be described in the context of storage and retrieval of dairy products, and in particular, cased dairy products that have been formed into case stacks typically five or six cases high. However, it will be appreciated by those of skill that the present invention has utility for the storage and retrieval of a wide variety of products.

Figure 2:
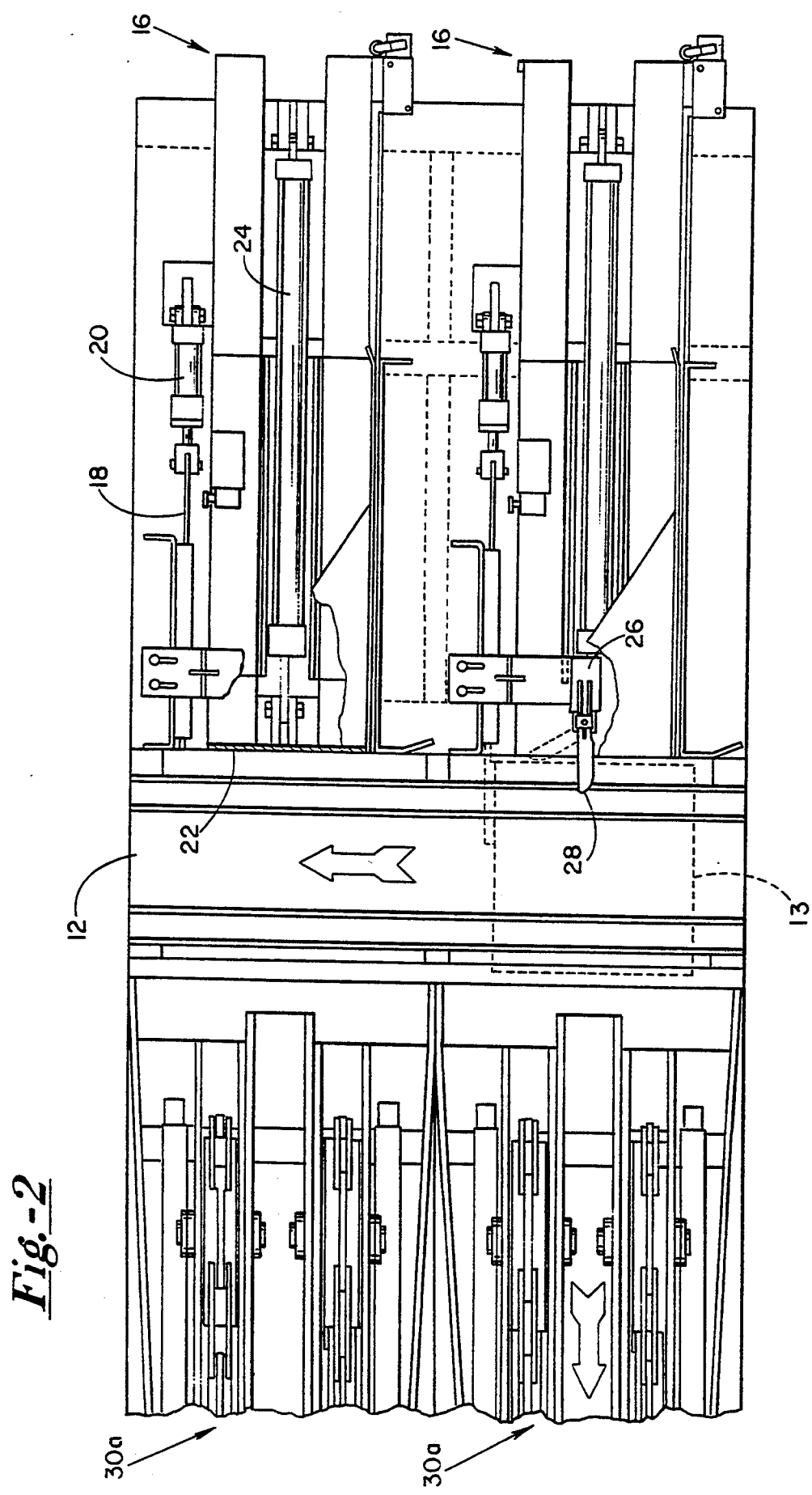
FIG. 2 shows a top plan detailed view of the load mechanism of the present invention.
Figure 3:
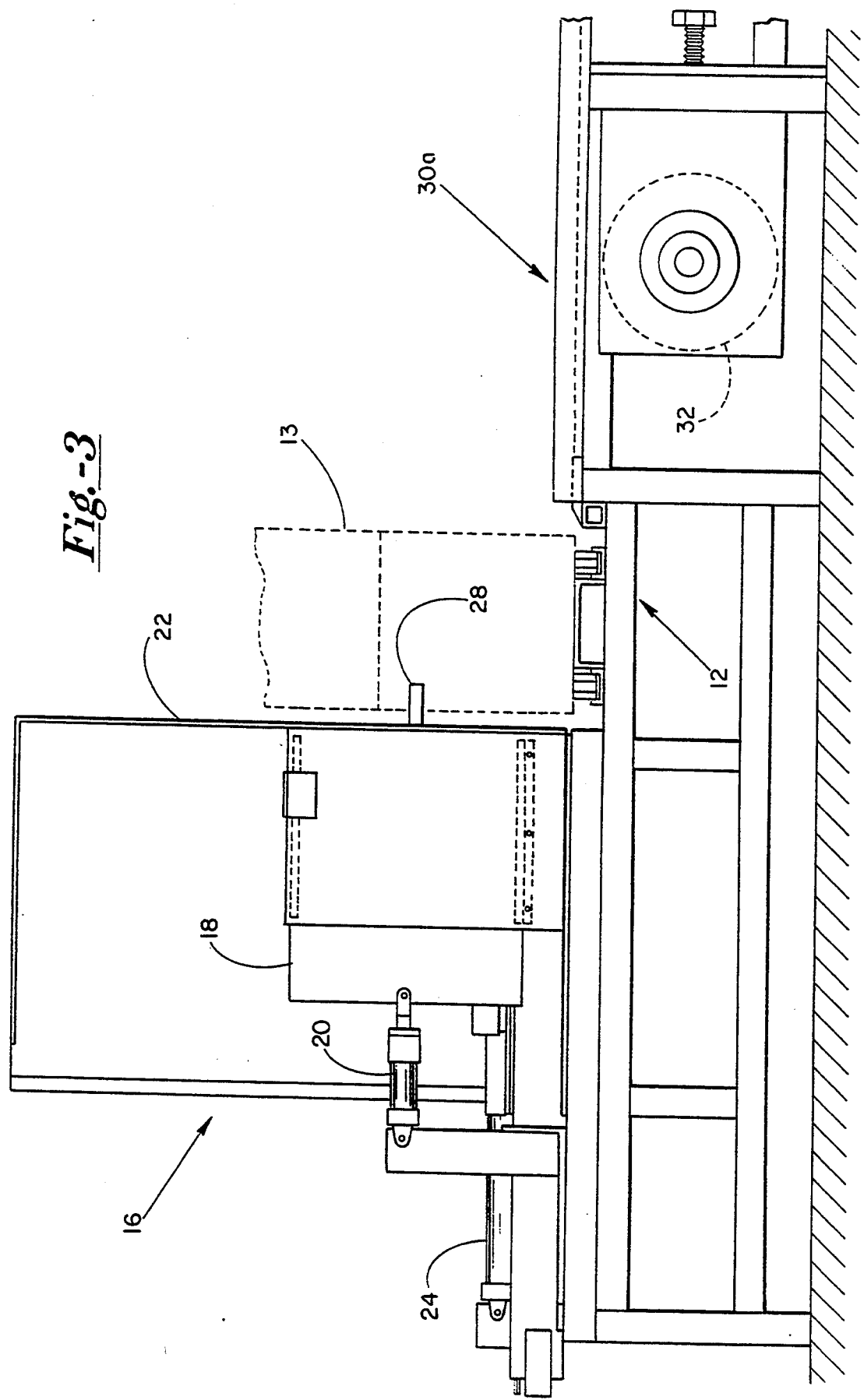
FIG. 3 shows a side plan detailed view of the load mechanism.

System 10 includes an in-feed conveyor 12 that carries the previously formed case stacks 13 from a bottling and crating facility, not shown, to a recognition system 14. In the present invention, a visual recognition system is used wherein a video camera, not shown, is positioned to look downwardly into the contents of the top case. Such information is sent to a recognition system computer means wherein structural and color cues are compared with stored data for determining the particular contents of the case stack. As also seen by referring to FIGS. 2 and 3, in-feed conveyor 12 runs along and adjacent to a plurality of loading mechanisms 16. Each loader mechanism 16 includes a vertically oriented stop plate 18 powered by a hydraulic cylinder 20, and a loading or pushing mechanism consisting of a pushing plate 22 operated by a cylinder 24. In addition, each loading mechanism 16 includes a limit switch 26 operated by a case sensing lever 28 extending above in-feed conveyor 12.

A plurality of the ratchet driven continuous chain conveyors 30 of the present invention extend perpendicularly along in-feed conveyor 12 across from loading mechanisms 16. Conveyors 30 include in-feed or loading end portions 30a and discharge end portions 30b, and include a plurality of regularly sized center sections 30c there between. Each loading section 30a includes a pair of chain sprockets 32 and each discharge portion 30b includes a corresponding pair of chain sprockets 34. A pair of continuous chains 36 extend around sprockets 32 and 34 and extend the length of conveyors 30. Chains 36 travel in upper chain channels 38 and lower chain channels 40. Chain channels 38 and 40 are supported by cross-members 42a and 42b respectively, and cross-members 42a and 42b constitute part of the conveyor 30 framework 44.

Figure 4:
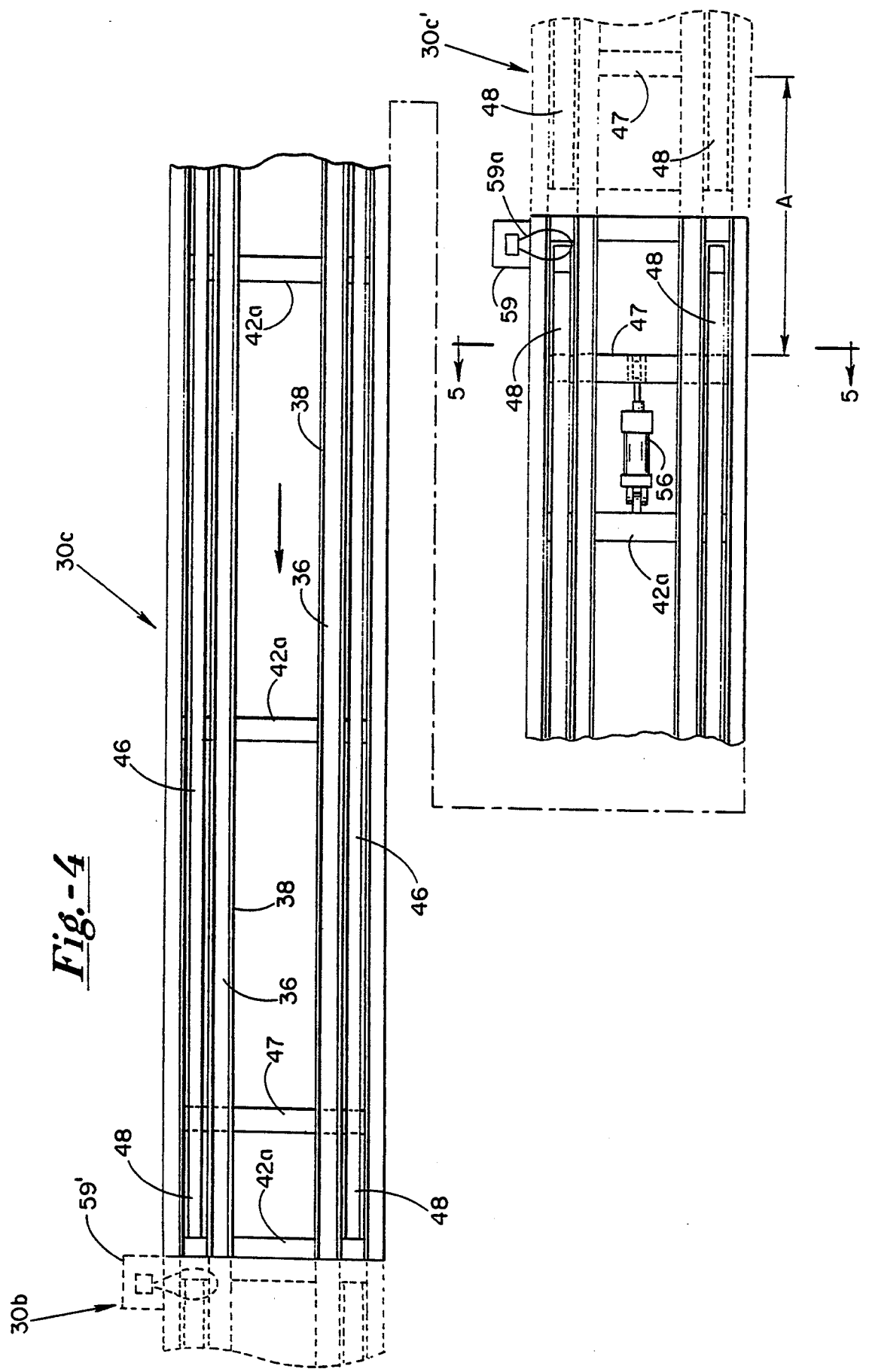
FIG. 4 shows a top plan view of a continuous chain ratchet conveyor center section.
Figure 5:
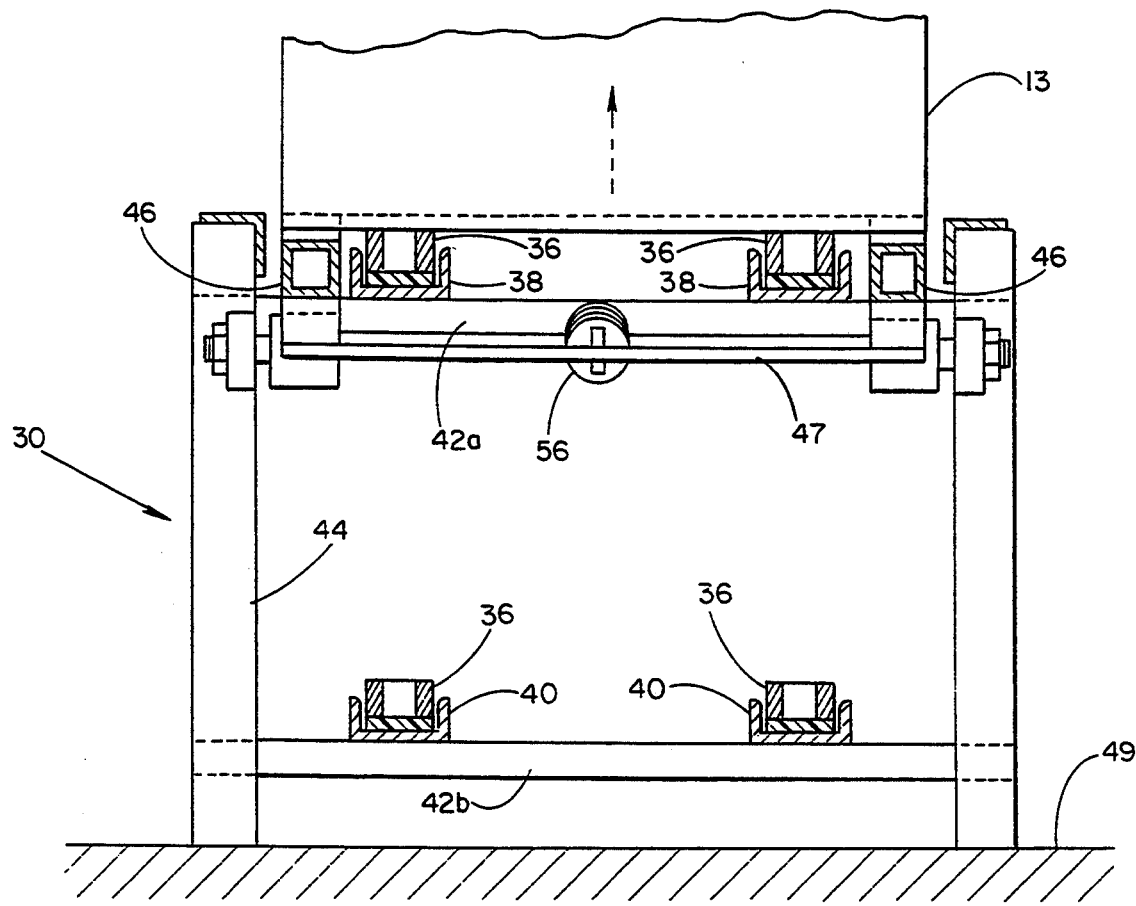
FIG. 5 shows a cross sectional view along lines 5—5 of FIG. 4.

The discharge conveyor sections 30b and intermediate sections 30c each include a lift mechanism. The lift mechanism includes a pair of rectangular parallel channel bars 46 extending along each respective section adjacent chain channels 38. Lift bars 46 are secured together at either end by cross-members 47 and each bar 46 includes end portions 48 angled downwardly in a direction towards a floor surface 49. A lifting block 50 having an inclined plane surface portions 50a is secured at either end of lifting bars 46. Surface portions 50a ride on wheels 52 rotatively mounted to supports 54. Each conveyor section 30b and 30c includes a lift operating piston 56. Piston 56 is secured on one end to a cross-member support 58, and on the other end to lift brackets 50. It can be appreciated that downwardly angled lift bar ends 48 create "live" areas, indicated by the arrow A in FIG. 4., between each center conveyor portion 30c and between the discharge conveyor portions 30b and the adjacent center section 30c. A limit switch 59 is mounted at the intake end of each conveyor section 30c and 30b to detect the presence or absence of a stack of cases 13 as it passes thereby.

A drive mechanism for each conveyor 30 can be seen by referring to FIGS. 6, 7, 8 and 9. Each conveyor 30 includes a chain drive piston 60. Piston 60 is secured on one end to a conveyor frame member 62, and on the other end to a dog assembly 64. Assembly 64 includes four gravity dogs 66 pivotally mounted thereto. Assembly 64 is slidably secured to guides 67. The four pivotally mounted dogs 66 include tooth ends 66a for cooperatively inserting into links 36a of each chain 36.

Figure 10:
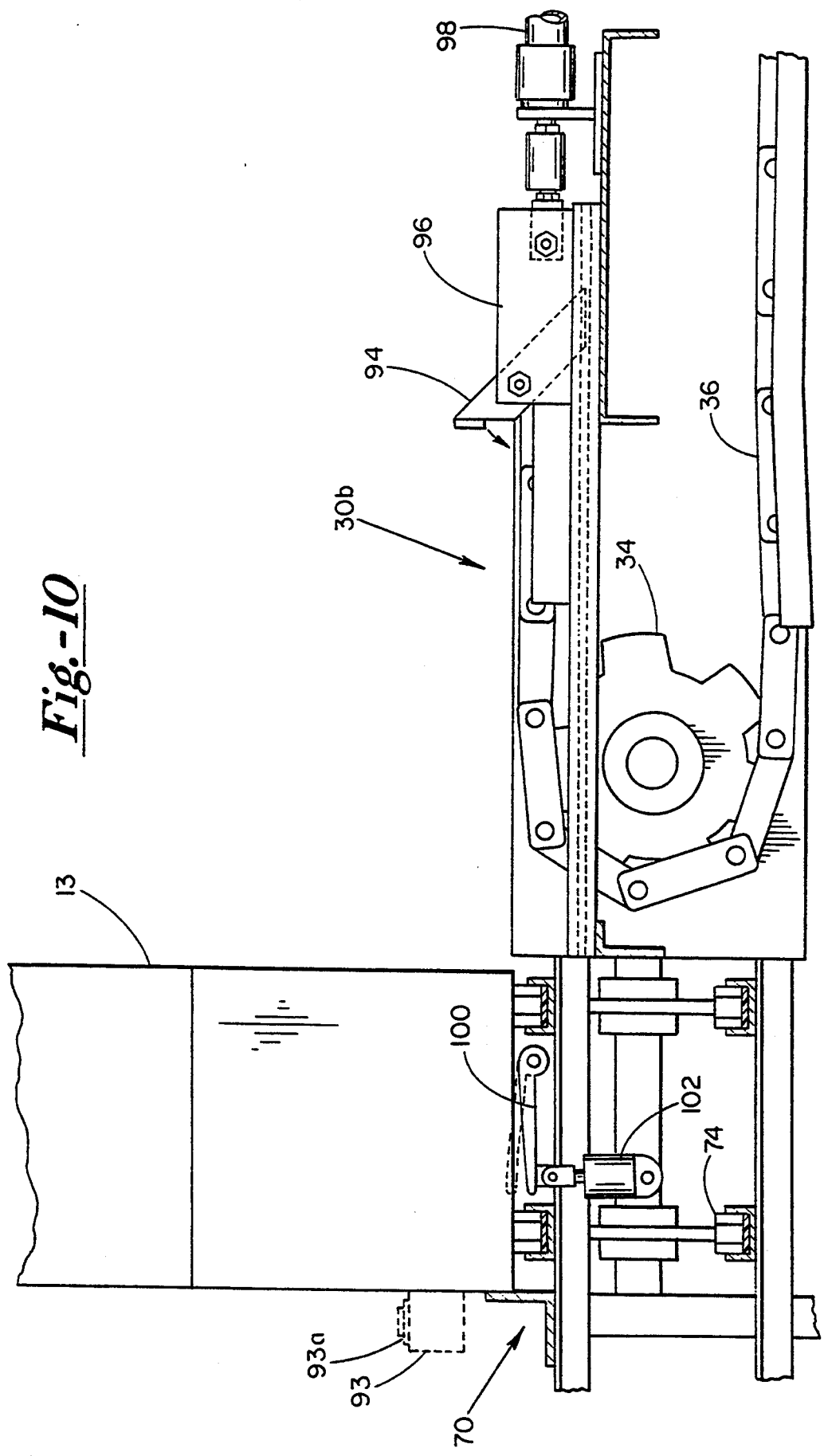
FIG. 10 shows a cross-sectional side plan view of an automatic discharge end of a storage conveyor.
Figure 11:
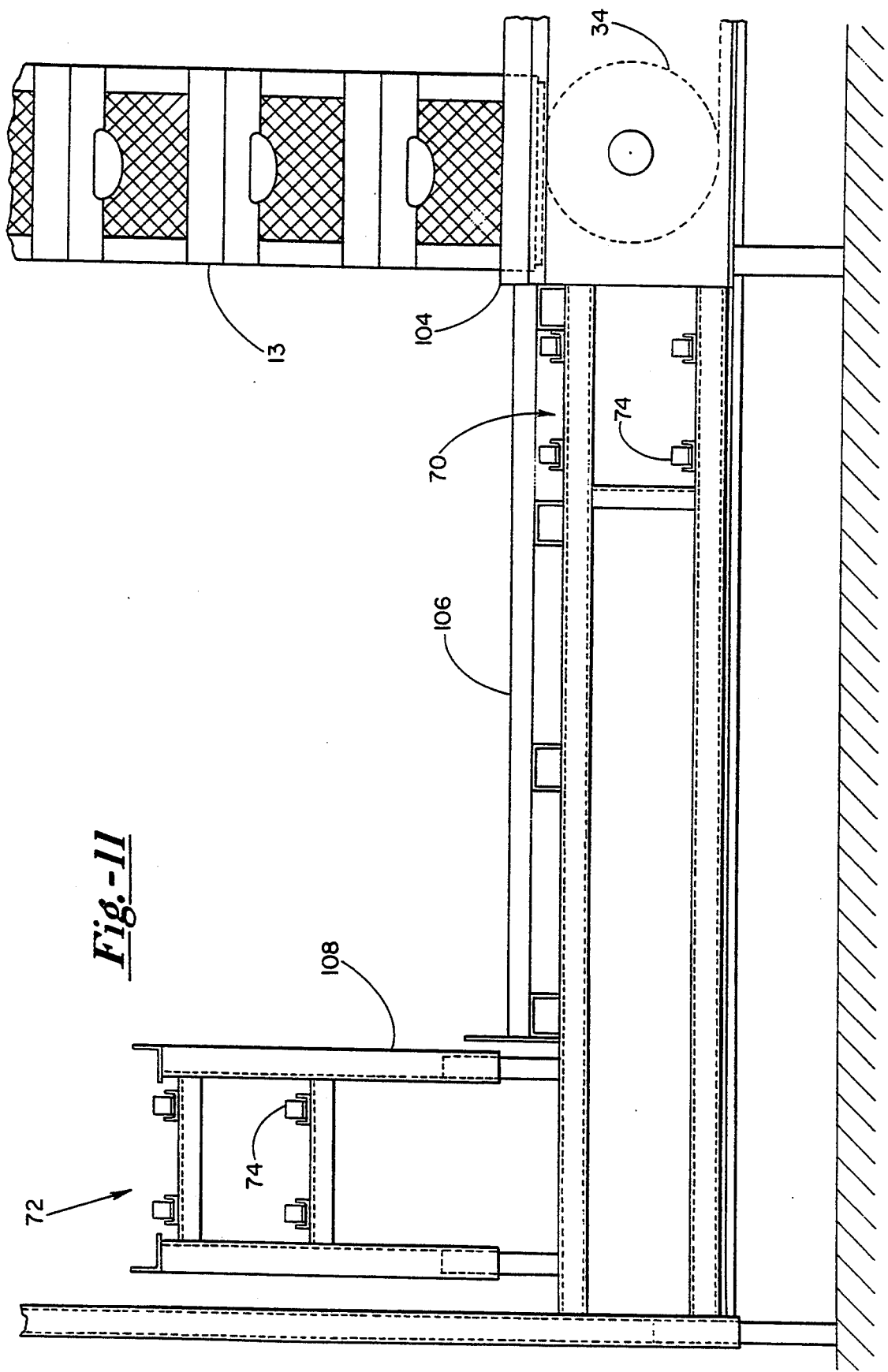
FIG. 11 shows a cross-sectional side plan view of a manual discharge end of a storage conveyor.

Referring to FIGS. 10 and 11, it is seen that discharge conveyor portions 30b terminate directly adjacent an out-feed conveyor 70. In addition, there exists a second out-feed conveyor 72 extending parallel with conveyor 70. Conveyors 70 and 72 are of the continuous chain type driven by electric motors, not shown, wherein chains 74 are driven in a continuous fashion therein.

Figure 6:
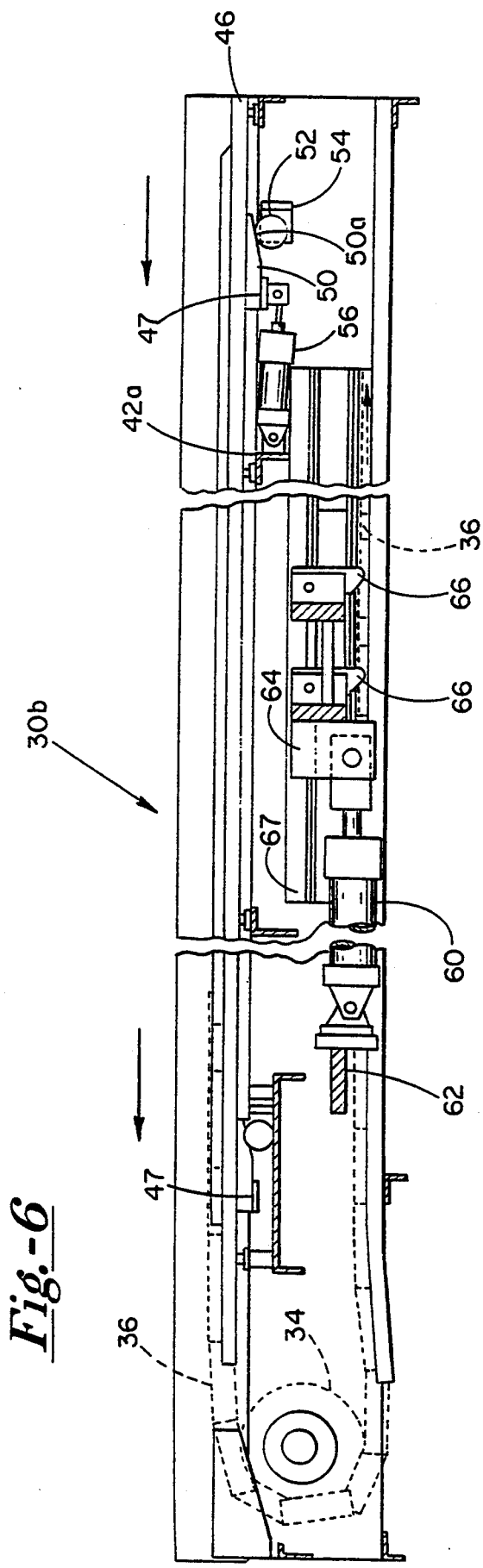
FIG. 6 shows a side plan view along lines 6—6 of FIG. 7.
Figure 7:
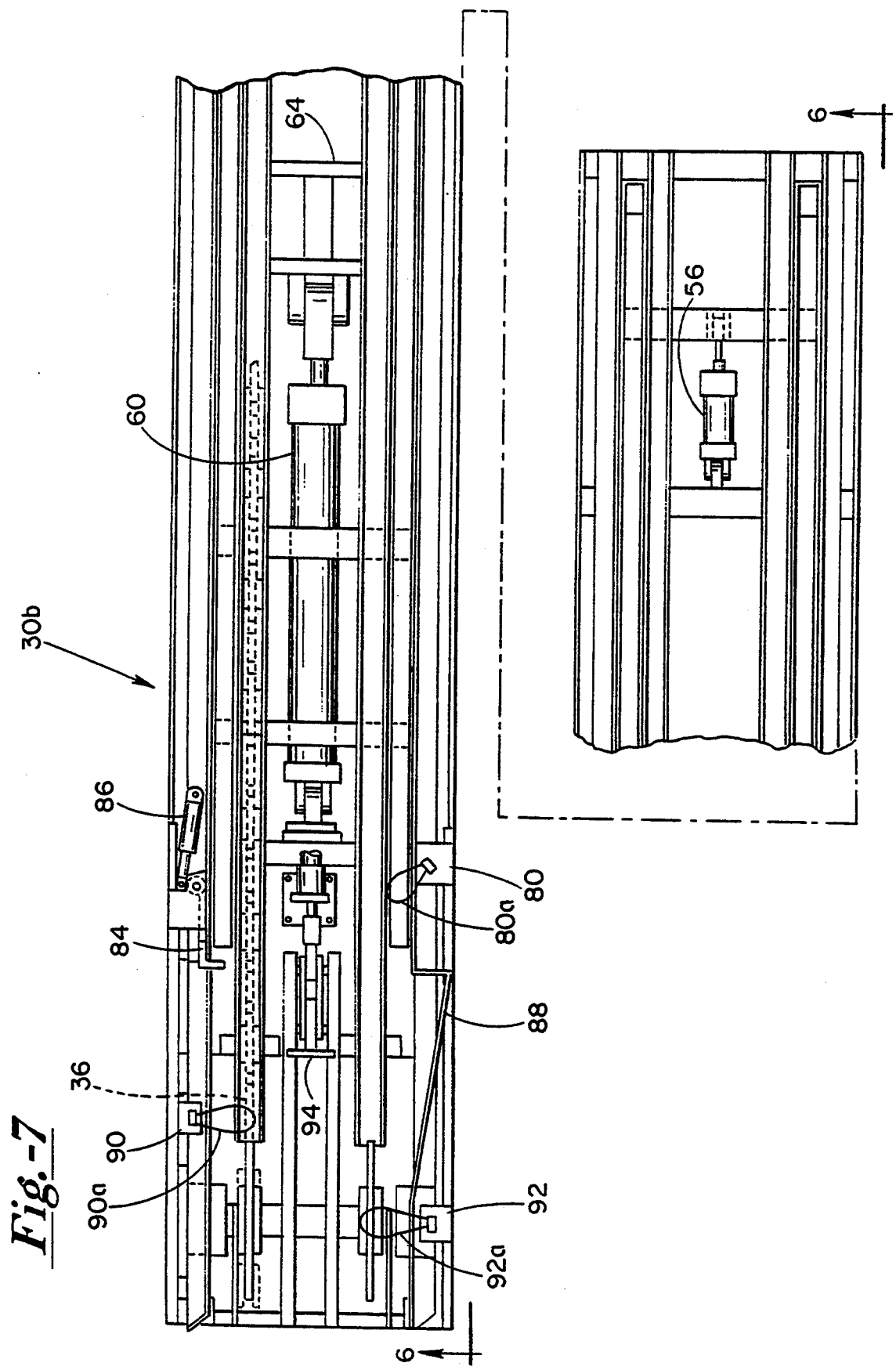
FIG. 7 shows a top plan view of the discharge end of a continuous chain ratchet conveyor having automatic discharge means.
Figure 8:
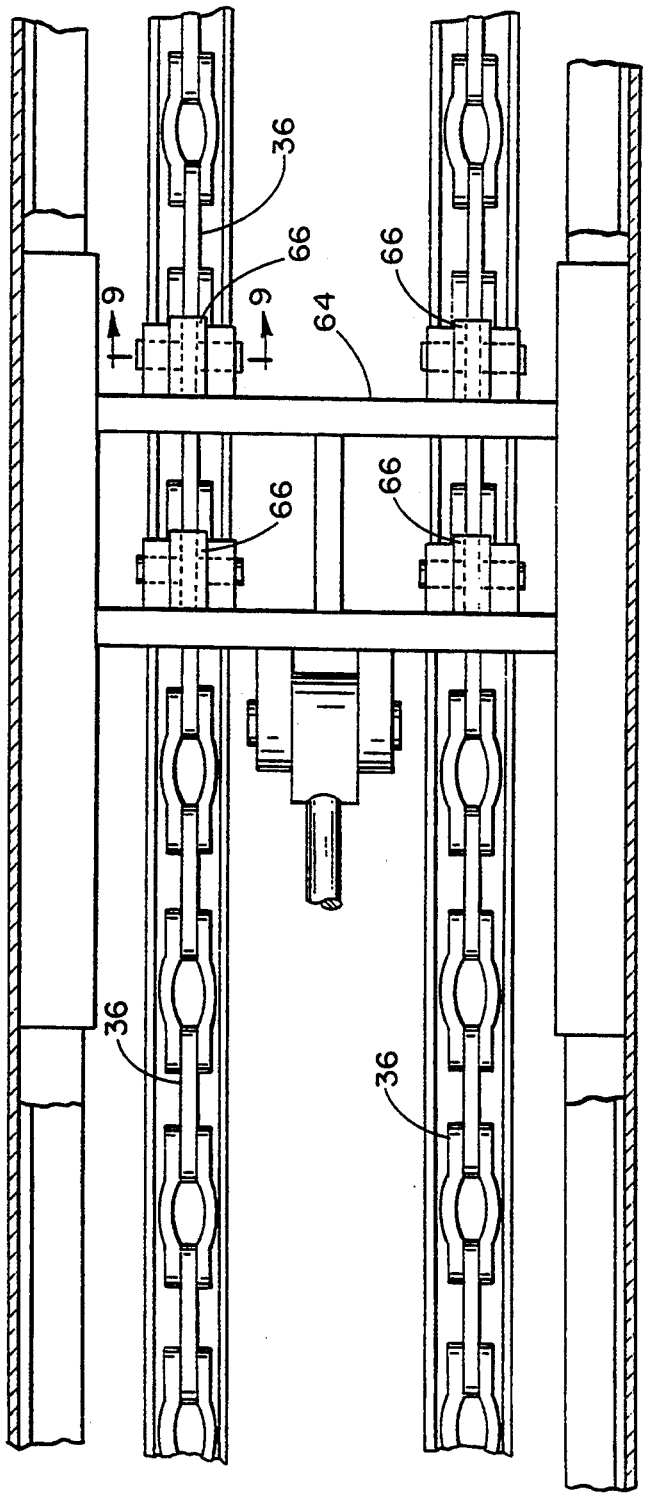
FIG. 8 shows a detailed top plan view of the ratchet drive mechanism of a ratchet driven continuous chain conveyor.
Figure 9:
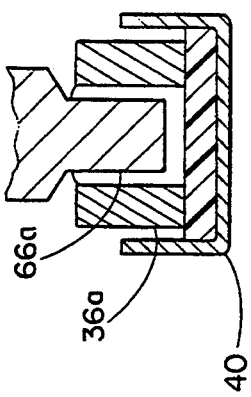
FIG. 9 shows a cross-sectional view along lines 9—9 of FIG. 8.

In the preferred form of the present invention, some of the conveyors 30 include an automatic discharge mechanism. As is known in the art, and as seen in FIGS. 6 and 7, the discharge mechanism includes a limit switch 80 secured to conveyor portion 30b and including a wire case contacting loop 80a. A "kick-stop" mechanism, as is known in the art, includes a kick-stop arm 84 pivotally mounted to conveyor portion 30b and operated by a cylinder 86. The discharge portion of conveyor portion 30b also includes an angled case guide rail portion 88 and three further limit switches 90,92 and 93 having case contacting loops 90a, 92a and 93a respectively. A gravity dog 94 is pivotally secured to a bracket 96, which bracket 96 is secured to a drive piston 98 mounted to the frame of conveyor portion 30b. Out-feed conveyor 70 includes a guide plate 100 pivotally secured to conveyor 80 and driven by a hydraulic piston 102.

It will be understood by those of skill that the conveyors 30 that do not include an automatic discharge means, terminate with a stop rail 104. As seen in FIG. 11, a floor 106 extends over the portion of out-feed conveyor 70 that extends in front of or adjacent the manual discharge conveyors 30. In addition, out-feed conveyor 72 is supported by a frame 108 above the surface level of floor 106. Conveyor 70 delivers case stacks to a case loading means 110, known in the art, wherein the case stacks are arranged onto dollies, or the like, for loading onto a truck for ultimate distribution. Conveyor 72 flows first to a case stacking means 111 and then to a case loading means 112. Use of a diverting means 114 provides for delivery of cases from either conveyor 70 or 72 to either of loading mechanisms 110 or 112. Conveyor 12 terminates at an error case receiving area 113, also, there exists a error dolly receiving area 115 adjacent recognition system 14.

Figure 12:
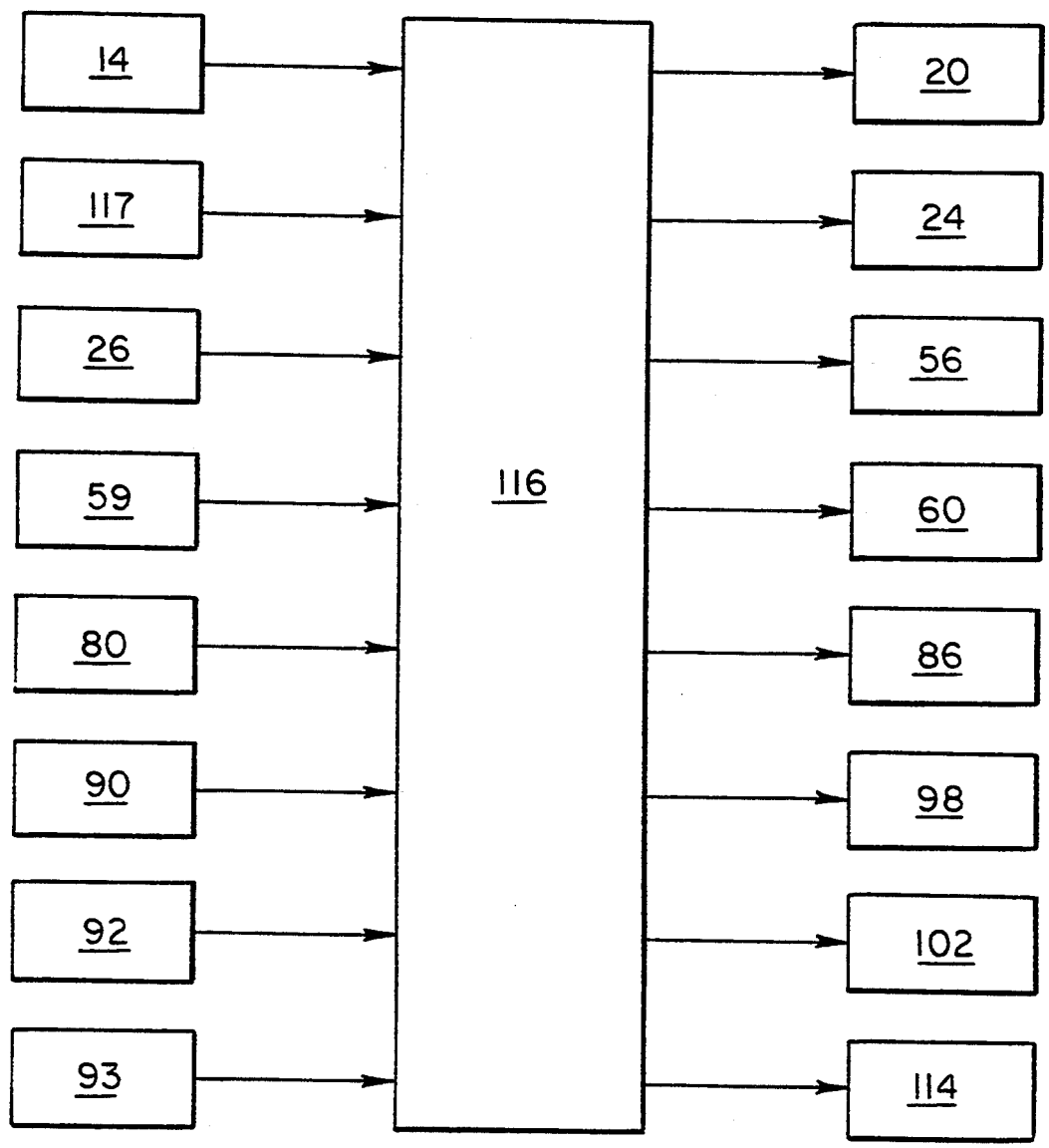
FIG. 12 shows a schematic diagram of the inputs to and apparatus controlled by the computer control means.

As seen schematically in FIG. 12, a computer control means 116 receives inputs from all various limit switches including switches 26, 59, 80, 90, 92 and 93 and the recognition means 14. Based upon such inputs, control means 116 operates cylinders 20, 24, 56, 60, 86, 98 and 102 for providing control of the entire system of the present invention. Moreover, a key pad 117 located in the discharge area of conveyors 70 and 72 provides for operator input based upon, for example, an order sheet. Thus, control 116 is programmed or operated in this manner to control the loading and discharge of case stacks appropriately to accommodate the order.

In particular, as is known in the art, after a case stack contents is determined by the recognition means 14 it must be loaded onto the particular conveyor 30 assigned at that time for accumulating stacks of that particular product. Thus, switches 26 provide information to control means 116 as to the stack progress and position down conveyor 12. When the proper number of switches 26 have been made, the stop blade 18 of the appropriate loading means 16 is extended to stop the progress of the stack. Cylinder 24 is then operated to push the stack onto the desired conveyor 30.

In the operation of conveyors 30, cylinders 60 are operated to extend wherein gravity dogs 66 cooperate with chains 36 to push the continuous chains in a ratcheting motion. Thus, the movement of chains 36, in the direction of the arrows as variously indicated, result in moving of the stacks of cases 13 from the loading ends 30a to the discharge ends 30b thereof. It can be appreciated by those of skill that the ratchet continuous chain conveyors of the present invention provide the advantage of requiring only one drive cylinder per conveyor 30, as compared to the plurality of large drive cylinders that are needed for a conventional ratcheting conveyor. Moreover, conveyors 30 can lie directly adjacent each other as the drive mechanism therefor is located centrally thereof. Also, a compressor, not shown, needed for providing the power for the various cylinders used in the present invention, can be placed at a remote location from the conveyors 30 and out of any refrigerated space that conveyors 30 may be located in.

It can be seen that pistons 56, when extended, provide for the movement of surface portions 50a of blocks 50 on wheels 52 wherein lift bars 46 are raised a small distance above the top of chains 36. Such lift means therefore provide the advantage of lifting the stacks of cases 13 slightly above chains 36 for reducing the load thereon when chains 36 are moving. In the present invention computer control means 116 regulates the operation of the lift means to provide for accumulating the stacks of cases 13 on conveyors 30. A better understanding of the accumulating strategy of the present invention can be had by again referring to FIG. 4. As seen therein, an adjacent section 30c' is shown in phantom as well as is the adjacent section 30b. Also, a further switch between section 30b and 30c is indicated as 59' so that the various conveyor sections and switches can be differentiated. Thus, at start-up all of the lift means are down and cases are loaded as required. As the stacks of cases flow to a discharge end 30b, they will eventually face-up, that is, contact each other and back-up until the limit switch 59' is constantly made indicating that section 30b is full. Once a section 30b is full the lifts of that section and of the immediately adjacent section 30c are operated to an up position. When a further stack progresses down adjacent conveyor section 30c', switch 59 will eventually be made and the lift associated with section 30c is operated to lower allowing progress of that stack. If this section 30c is not full that stack will pass by switch 59 causing the loop 59a thereof to swing back deactivating that switch. Control 116 will then again raise the lift associated with that section. Such process involving the lowering and raising of a lift means each time a case stack 13 passes thereby will continue until the switch 59 thereof is constantly made indicating a full section and the lift thereof will go up. This process then occurs between all the sections 30c and the sections 30b and the section 30 adjacent thereto. It can be appreciated that the live section indicated by arrow A permits stack movement whether the lifts are up or down so that movement will always be able to occur from one conveyor section to another. Also, operation of one lift and not the other in a particular live section will not result in the tipping of a case stack. It can be appreciated that such loading or accumulating lift control strategy occurs between all of the various sections 30c of each conveyor 30. Control 116 can then selectively lower the various lifts as discharge is required. Of course, discharge will cause switches 59 to become open so that the lifts associated therewith can be lowered to permit further case stack movement. If no switch 59 on a particular conveyor 30 is operated either on or off for a predetermined period of time, control 116 will cause the chains 36 of that conveyor to stop as no more accumulating or discharging is occurring thereon. A safety is provided wherein if all switches 59 of a particular conveyor 30 are made indicating a completely full conveyor no more loading can occur thereon until space permits. A further margin for error is provided where one or more of the sections 30c adjacent the conveyor loading end do not have switches 59 or lift means associated therewith.

As is known in the art, the discharge mechanism of the present invention operates wherein limit switch 80 detects the presence of a case 13 by the movement of the loop portion 80a thereof. Piston 86 is then operated to pull stop 84 away from a bottom case 13 wherein chains 36 of conveyor 30 provide for movement of the stack of cases in the direction towards limit switch 90. When limit switch loop 90a is contacted, piston 86 is again activated wherein stop 84 returns to its original position pushing the rear of the bottom case 13 inwardly in a direction towards angled guide 88. As is known, angled portion 88 accommodates such movement of case 13 wherein stop 84 can then again resume its original position and provide for stopping the movement of any further stack of cases 13. When switch 91 is made, discharge piston 98 can then be operated to extend to move dog 94 wherein the stack of cases 13 are moved off of discharge end 30b of conveyor 30 and onto conveyor 70. As piston 98 is being activated, piston 102 is also operated to move angled plate 100 upwardly so that the stack of cases can slide more easily onto the moving chains 74 of conveyor 70. Switch 93 is used to indicate that a stack was successfully loaded onto out feed conveyor 70.

As stated, some of the conveyors 30 preferably lack the automatic discharge means. It can be appreciated by referring again to FIG. 11, that an operator can pick individual cases 13 from the manual conveyors 30 and then place them individually onto out-feed conveyor 72. Flooring 106 provides for covering that portion of conveyor 70 running along the discharge ends 30b of conveyors 30 that do not have the automatic discharge means so that the operator has an unobstructed and safe approach to cases 13. Also, conveyor 72 is supported above the flooring 106 to minimize the amount of bending required by the operator when loading cases thereon. Thus, non-automatically discharging conveyors 30 can carry the lower volume goods that are preferably individually picked rather than discharged in full stacks. It will be appreciated that stacking means 109 therefore provides for reassembling the individual cases placed onto conveyor 72 into stacks prior to delivery to loading means 108 or 110.

Case stacks that are, for example, mistakenly sent from the bottling facility, or mis-read by the recognition system and which the control means 116 is not programmed to assign a lane to can pass entirely past all the loading means 16 to error receiving area 113. The error stacks can then be transported on a dolly to receiving area 114 for manual replacement on conveyor 12 for re-introduction to recognition system 14 or transported back to the bottling facility.

For purposes of providing clarity in the description and representation of the present invention, various components such as hydraulic and electrical connections, piston operating valves, piston limit or proximity switches and the like, have not been included, the structure function and operation of such being well within the skill of the art. Also, it will be apparent to those of skill that the spirit and scope of the present invention is not limited to the particular embodiments shown and described herein.

We Claim:

1. A ratchet chain conveyor, comprising:
a frame, at least one chain means extending around sprockets rotatively connected to opposite ends of the frame, cylinder drive means secured to the frame, the cylinder dive means having gravity dog means pivotally secured to an end of a piston thereof, the gravity dog means for engaging with the chain means during an extension of the piston and for disengaging with the chain means during a retraction of the piston for providing a ratcheting movement of the chain means for moving objects resting on the chain means from one end of the conveyor to the other, and further including lift means for lifting objects carried on the conveyor out of substantial contact with the chain means thereof, the lift means including a pair of parallel lift bars extending along either side of a portion of the chain means, and a lift drive means secured to the lift bars for operating the bars so that they provide for the lifting of the objects out of substantial contact with the chain means.

2. The apparatus as described in claim 1, and the cylinder drive means secured substantially within an exterior perimeter of the frame.

3. The apparatus as defined in claim 1 and the lift drive means comprising a second cylinder secured on one end thereof to the frame, and the second cylinder having a second cylinder piston arm extending from a second end thereof and secured to a common cross member secured to and extending between each lift bar, and each lift bar having inclined surfaces thereon, and friction reducing lift means secured to the frame for contacting the inclined surfaces thereof so that operation of the second cylinder piston arm in a first direction lifts the bars as a result of the inclined surfaces thereof riding on and contacting the friction reducing lift means, and wherein operation of the second cylinder piston arm in a second direction lowers the bars.

4. The apparatus as defined in claim 3, and the conveyor having a plurality of lift means along the length thereof.

5. A ratchet chain conveyor, comprising:
a frame, a pair of substantially parallel and spaced apart chain means extending around sprockets rotatively connected to opposite ends of the frame, linear drive means secured to the frame, the linear drive means having gravity dog means pivotally secured to the end of a linear operating arm thereof, the gravity dog means for engaging with the chain means during an extension of the arm and for disengaging with the chain means during a retraction of the arm for providing a ratcheting movement of the chain means for moving objects resting on the chain means from one end of the conveyor to the other, and the conveyor including lift means for lifting objects carried on the conveyor out of substantial contact with the chain means thereof, and the lift means including a pair of lift bars spaced apart and extending along a portion of the conveyor and a lift drive means for operating the bars to an up position for holding the objects out of substantial contact with the chains, and to a down position for permitting the objects to rest on the chains.

6. The apparatus as described in claim 5, and the linear drive means secured substantially within an exterior perimeter of the frame.

7. The apparatus as defined in claim 6, and the lift drive means comprising a second cylinder secured on one end thereof to the frame, and the second cylinder having a second cylinder piston arm extending from a second end thereof and secured to a common cross member secured to and extending between each lift bar, and each lift bar having inclined surfaces thereon, and friction reducing lift means secured to the frame for contacting the inclined surfaces thereof so that operation of the second cylinder piston arm in a first direction lifts the bars as a result of the inclined surfaces thereof riding on and contacting the friction reducing lift means, and wherein operation of the second cylinder piston arm in a second direction lowers the bars.

8. The apparatus as defined in claim 7, and the conveyor having a plurality of lift means along the length thereof.

9. A ratchet chain conveyor, comprising:

a frame, a pair of substantially parallel and spaced apart chains extending around sprockets rotatively connected to opposite ends of the frame and the chains extending within lower parallel chain guides secured to a lower portion of the frame, and upper parallel chain guides secured to a top surface of the frame, linear drive means secured to the frame, the linear drive means comprising a first cylinder secured to the lower frame portion centrally of the lower chain guides, and the first cylinder having a first arm operable to extend and retract, the first arm having a mounting head on an end thereof, the mounting head having a first and a second pair of gravity dogs pivotally secured thereto, the gravity dogs of each pair aligned so that each pair provide for simultaneous driving of one of the chains when the first cylinder arm extends, and the mounting head oriented so that each gravity dog pair engage their respective chain as each chain travels through the lower chain guides and disengage each chain as the first cylinder arm is retracted.

10. The apparatus as described in claim 9, and further including lift means for lifting objects carried on the chain means out of substantial contact therewith for stopping movement of the objects along the conveyor and the lift means including a pair of lift bars spaced apart and extending along the conveyor and a lift drive means for operating the bars to an up position for holding the objects out of substantial contact with the chains, and to a down position for permitting the objects to rest on the chains.

11. The apparatus as defined in claim 10, and the lift drive means comprising a second cylinder secured on one end thereof to the frame, and the second cylinder having a second cylinder piston arm extending from a second end thereof and secured to a common cross member secured to and extending between each lift bar, and each lift bar having inclined surfaces thereon, and friction reducing lift means secured to the frame for contacting the inclined surfaces thereof so that operation of the second cylinder piston arm in a first direction lifts the bars as a result of the inclined surfaces thereof riding on and contacting the friction reducing lift means, and wherein operation of the second cylinder piston arm in a second direction lowers the bars.

12. The apparatus as defined in claim 11, and the conveyor having a plurality of lift means along the length thereof.

* * * * *